(12) United States Patent
Lassini et al.

(10) Patent No.: US 10,169,175 B2
(45) Date of Patent: Jan. 1, 2019

(54) PROVIDING FAILOVER CONTROL ON A CONTROL SYSTEM

(71) Applicant: GE Aviation Systems LLC, Grand Rapids, MI (US)

(72) Inventors: Stefano A. M. Lassini, Lowell, MI (US); Timothy John Theriault, Kentwood, MI (US); Mark Lawrence Darnell, Grand Rapids, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 199 days.

(21) Appl. No.: 15/095,285

(22) Filed: Apr. 11, 2016

(65) Prior Publication Data

US 2016/0321148 A1 Nov. 3, 2016

Related U.S. Application Data

(60) Provisional application No. 62/154,918, filed on Apr. 30, 2015.

(51) Int. Cl.
| | |
|---|---|
| *G06F 11/18* | (2006.01) |
| *G06F 11/20* | (2006.01) |
| *B64C 13/50* | (2006.01) |
| *G07C 5/08* | (2006.01) |
| *G06F 11/16* | (2006.01) |

(52) U.S. Cl.
CPC .......... *G06F 11/2033* (2013.01); *B64C 13/50* (2013.01); *G06F 11/1645* (2013.01); *G06F 11/184* (2013.01); *G06F 11/2025* (2013.01); *G06F 11/2028* (2013.01); *G07C 5/0808* (2013.01); *G06F 2201/805* (2013.01)

(58) Field of Classification Search
CPC ............. G06F 11/2033; G06F 11/1645; G06F 11/184; G06F 11/2025; G06F 11/1425; G06F 11/187; G05B 2219/231; G05B 2219/2237
See application file for complete search history.

(56) References Cited

U.S. PATENT DOCUMENTS

| | | | |
|---|---|---|---|
| 6,609,213 B1 * | 8/2003 | Nguyen | ............. G06F 11/2025 709/223 |
| 6,701,453 B2 | 3/2004 | Chrabaszcz | |
| | | (Continued) | |

OTHER PUBLICATIONS

Office Action issued in connection with corresponding CA Application No. 2927517 dated Mar. 30, 2017.
(Continued)

*Primary Examiner* — Yolanda L Wilson
(74) *Attorney, Agent, or Firm* — General Electric Company; William Andes

(57) ABSTRACT

Systems and methods for providing failover control in a control system are provided. For instance, a data stream from a plurality of computing nodes in a computing system can be monitored. A first subset of computing nodes can be selected based on the data streams. Control grant signals can be generated for each computing node of the first subset. An output to one or more computing nodes of the first subset can be activated based at least in part on a number of control grant signals generated for each computing node of the first subset. Control authority can then be granted to the one or more computing nodes of the first subset.

19 Claims, 7 Drawing Sheets

(56) References Cited

U.S. PATENT DOCUMENTS

| | | | |
|---|---|---|---|
| 7,058,846 B1* | 6/2006 | Kelkar | G06F 11/2033 |
| | | | 714/11 |
| 7,096,333 B2 | 8/2006 | McBrearty et al. | |
| 7,689,862 B1 | 3/2010 | Bharthulwar et al. | |
| 8,359,112 B2 | 1/2013 | Kephart et al. | |
| 8,826,285 B2 | 9/2014 | Beltrand | |
| 2002/0042693 A1* | 4/2002 | Kampe | H04L 41/0618 |
| | | | 702/186 |
| 2003/0023680 A1* | 1/2003 | Shirriff | G06F 11/0709 |
| | | | 709/204 |
| 2004/0001431 A1 | 1/2004 | Rostron | |
| 2004/0205388 A1* | 10/2004 | Nakano | G06F 11/2033 |
| | | | 714/11 |
| 2005/0220122 A1* | 10/2005 | Kinstler | H04L 12/10 |
| | | | 370/400 |
| 2007/0220323 A1* | 9/2007 | Nagata | G06F 11/2025 |
| | | | 714/13 |
| 2009/0113034 A1* | 4/2009 | Krishnappa | G06F 15/16 |
| | | | 709/223 |
| 2010/0011242 A1* | 1/2010 | Baba | G06F 11/2028 |
| | | | 714/11 |
| 2015/0019900 A1 | 1/2015 | Griffith et al. | |
| 2017/0132047 A1* | 5/2017 | Voutilainen | G06F 9/5061 |

OTHER PUBLICATIONS

European Search Report and Opinion issued in connection with corresponding EP Application No. 16167689.5 dated Nov. 9, 2016.

* cited by examiner

PROVIDING FAILOVER CONTROL ON A CONTROL SYSTEM

PRIORITY CLAIM

The present application is based on and claims priority to U.S. Provisional Application 62/154,918 having a filing date of Apr. 30, 2015, which is incorporated by reference herein.

FIELD OF THE INVENTION

The present subject matter relates generally to control systems, and more particularly to providing failover control on a control system.

BACKGROUND OF THE INVENTION

Modern aircraft may employ multiple computers to perform a variety of tasks, including acquiring information, or controlling systems associated with a plurality of functions, such as for instance, flight control, navigation, health, maintenance functions and/or other suitable function. For flight-critical applications redundancy and fail-tolerance may be required due in part to the potential impact of failures.

Redundant failover control systems may require a supervisor that monitors system health and/or the functional state of the system, and prevents non-functioning and/or malfunctioning computing nodes from corrupting the integrity of the system. In particular, the supervisor can grant control to one or more computing nodes and remove control from one or more non-functioning and/or malfunctioning computing nodes. In this manner, if one computing node fails, a standby computing node can be granted authority to control the system without an overall failure of the system. Such redundancy may be difficult to add to control systems that were originally designed for non-redundant computing nodes. For instance, implementing redundancy techniques in an aircraft that is not wired, setup or otherwise adapted to handle system supervisors for redundant control systems can require a major overhaul of the aircraft systems.

BRIEF DESCRIPTION OF THE INVENTION

Aspects and advantages of embodiments of the present disclosure will be set forth in part in the following description, or may be learned from the description, or may be learned through practice of the embodiments.

One example embodiment of the present disclosure is directed to a method of providing failover control in a computing system. The method includes monitoring a data stream generated by a plurality of computing nodes in a computing system. The method further includes selecting a first subset of the plurality of computing nodes based at least in part on the monitored data stream. The method further includes generating one or more control grant signals for each computing node of the first subset. The method further includes activating an output to one or more computing nodes of the first subset based at least in part on a number of control grant signals generated for each computing node of the first subset. The method further includes granting control authority of the computing system to the one or more computing nodes of the first subset.

Another example aspect of the present disclosure is directed to a failover control system for granting computing nodes control authority of a computing system. The system includes a plurality of computing nodes and a failover controller configured to grant control authority to at least one computing node. The failover controller includes a plurality of failover monitors configured to monitor a data stream from each computing node, select a first subset of the plurality of computing nodes based at least in part on the monitored data stream, and generate one or more control grant signals for at least one computing node of the first subset. The failover controller further includes a plurality of control vote circuits. Each control vote circuit is coupled between the plurality of failover monitors and a computing node. Each control vote circuit is configured to grant control authority to the corresponding computing node when the control vote circuit receives at least two control grant signals from the plurality of failover monitors.

Yet another example aspect of the present disclosure is directed to a control system for an aircraft. The control system includes a plurality of computing nodes and a failover controller configured to grant control authority to at least one computing node. The failover controller includes a plurality of failover monitors configured to monitor a data stream from each computing node, select a first subset of the plurality of computing nodes based at least in part on the monitored data stream, and generate one or more control grant signals for at least one computing node of the first subset. The failover controller further includes a plurality of control vote circuits. Each control vote circuit is coupled between the plurality of failover monitors and a computing node. Each control vote circuit is configured to grant control authority to the corresponding computing node when the control vote circuit receives control grant signals from at least a majority of the plurality of failover monitors.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
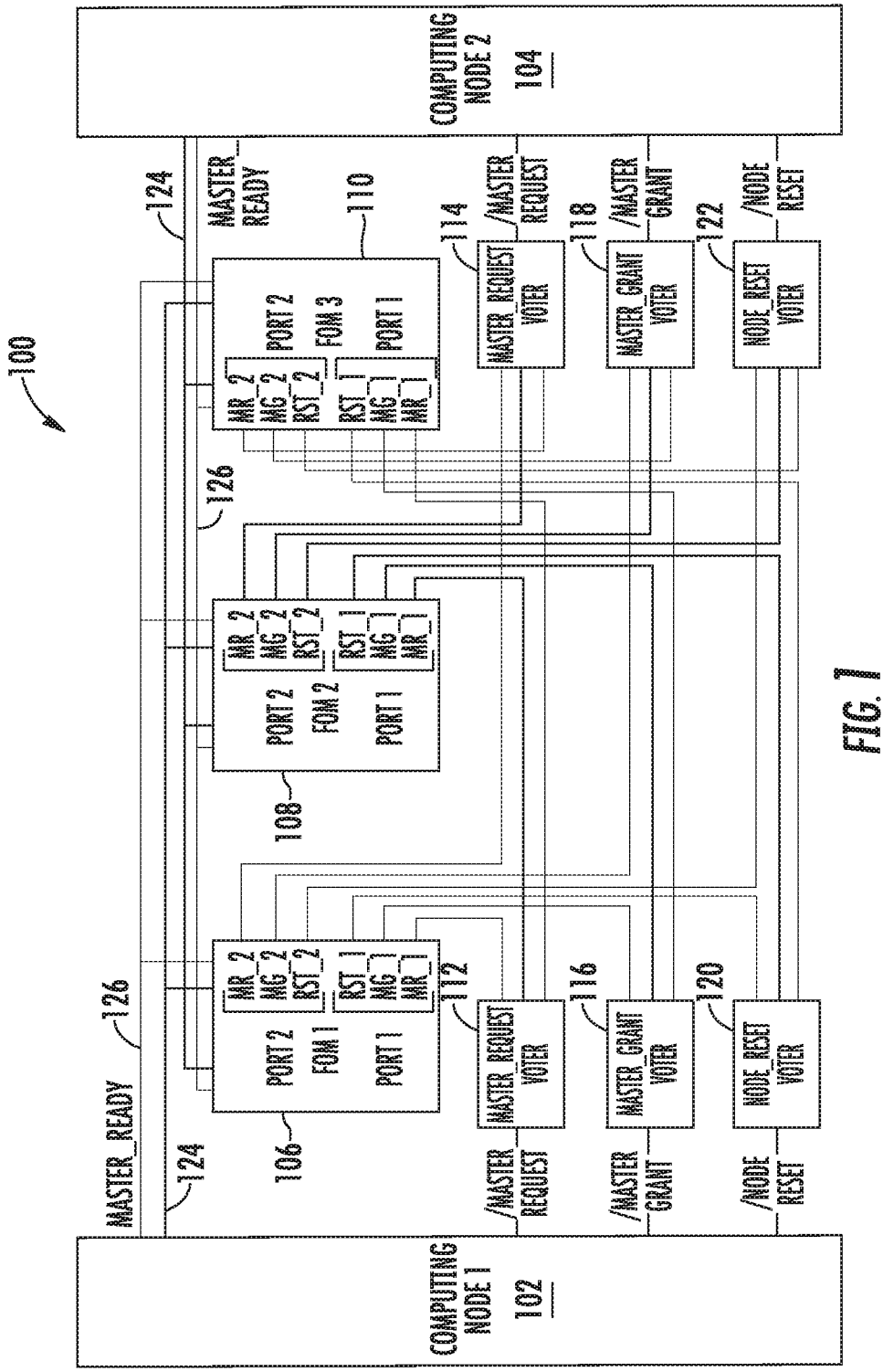
FIG. 1 depicts an example failover control circuit according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to providing failover control authority to one or more computing nodes in a control system. For instance, data streams provided by a plurality of computing nodes in a control system associated with a computing system (e.g. an avionics computing system) can be monitored to identify one or more valid data streams. A valid data stream can be indicative, at least in part, of a computing node that is capable of controlling the computing system. Control authority of the control system can be granted to at least one computing node having a valid data stream.

More particularly, a failover control system can be coupled to or otherwise implemented within a computing system such as an avionics computing system associated with an aircraft. In some implementations, the failover controller can be implemented within an aircraft, such as a legacy aircraft, that is not wired, setup, or otherwise adapted for supervision of redundant control systems. The control system can include a plurality of computing nodes and a failover controller configured to grant control authority to at least a subset of the control nodes. In some implementations, the failover controller can include a plurality of failover monitors and a plurality of control voter circuits. For instance, the failover monitors can be separate, independent devices configured to monitor the health of the computing nodes in the system. Each voter circuit can be coupled between a computing node and the plurality of failover monitors.

The failover monitors can be configured to monitor a continuous serial data stream respectively transmitted by the computing nodes. The data streams can be generated by the computing nodes upon completion of a power-on process of the computing nodes. As another example, the data streams can be provided upon completion of a reset process by the computing nodes. Provision of the data streams to the failover monitors can indicate the health of the computing nodes. In some implementations, the data stream can include a sequence of data words determined in accordance with one or more predetermined algorithms. The data streams can be monitored to determine valid data streams. A valid data stream can be a data stream having the correct sequence and/or timing of data words. As indicated, a valid data stream provided by a computing node can indicate that the computing node is functioning properly, and is capable of controlling the computing system (e.g. having control authority on the control system).

Upon detection of a sufficient number of valid data streams, the failover monitors can initiate a control grant process. The policy that defines the sufficient number can be determined at least in part on the requirements of the computing system and/or control system. For instance, if the computing system requires only one computing node be granted control authority at a time, the sufficient number of valid data streams is one. If the computing system requires two computing nodes be simultaneously granted control authority over the computing system, the sufficient number is two.

The control grant process can include requesting that one or more computing nodes assume control of the control system. The one or more computing nodes can be selected based at least in part on an order of receipt of the continuous data stream. In particular, the failover monitors can provide a control (or master) request signal to the computing nodes corresponding to the identified valid data streams. The computing nodes can confirm their ability to control the computing system by providing a control (or master) ready signal back to the failover monitors. In some implementations, if a computing node does not provide a control ready signal back to the failover monitors within a predetermined time period, the failover monitors can select a different computing node having a valid data stream as a replacement.

Upon receiving the control ready signals, the failover monitors can generate control (or master) grant signal outputs for the corresponding computing node(s). Such control grant signals can provide an indication to the computing node(s) that the computing node(s) have control authority over the control system. In some implementations, the control grant signals can be used by the computing node hardware as an independent enabling signal to ensure that only the correct nodes have control authority.

As indicated, in some implementations, the failover controller can include a plurality of voter circuits coupled between the output of the failover monitors and the computing nodes. For instance, the failover controller may include a control request voter circuit, a control grant voter circuit, and a reset voter circuit for each computing node. In some implementations, the voter circuits can include an open collector structure that implements a Boolean equation ensuring that the voter circuit output to the computing node is active based at least in part on the number of failover monitor outputs received. The outputs of the failover monitors can be provided to the corresponding voter circuits in a manner to implement failsafe service. In particular, the voter circuits can be configured such that a predetermined number of failover monitor outputs must concur to activate an output of the voter circuit. In some implementations, the predetermined number of failover monitors may be a majority of failover monitors. In this manner, the number of failover monitor outputs can be compared to a threshold. If the number of failover monitor outputs is greater than or equal to the threshold, the voter circuit output can be activated, such that a corresponding control signal is provided to the computing node.

As an example, in some implementations, at least two failover monitors must provide an appropriate signal to the voter circuits before the voter circuits provide the corresponding control grant output to the computing nodes. For instance, if a first failover monitor and a second failover monitor generate control grant signals for a first computing node, and provide the control grant signals to a corresponding control grant voter circuit, the voter circuit can activate a control grant output to the first computing node. In such scenario, if a third failover monitor provides a control grant signal to a voter circuit corresponding to a second computing node, the voter circuit will not activate a control grant output to the second computing node.

Once control authority has been granted to the sufficient number of computing nodes, a standby subset of computing nodes can be determined. In particular, the standby subset of computing nodes can be computing nodes that do not currently have control authority on the control system, but that are capable of having control authority. In some implementations, the standby subset can be determined based at least in part on the data streams provided by the computing nodes. In particular, the standby subset can be determined by identifying valid data streams from one or more computing nodes that do not currently have control authority, and adding the computing nodes to the standby subset.

In some implementations, one or more computing nodes having control authority can be removed from authority and/or reset. For instance, the failover monitors can detect an invalid data stream from a controlling computing node. An invalid data stream can correspond to an interruption and/or an error in the data stream, and can indicate that the computing node is not functioning properly, and/or not capable of having control authority. In response to detecting the invalid data stream, the failover monitors can remove control authority from the computing node, and replace the computing node with a computing node from the standby subset. In this manner, the computing node from the standby subset can be granted control authority in accordance with example aspects and implementations of the present disclosure.

As another example, a controlling computing node can relinquish or de-assert its control authority. In such scenario, the failover monitors can select a replacement computing node from the standby subset, remove the control authority from the relinquishing computing node, and grant control authority to the replacement computing node.

A computing node can be reset based at least in part on a detected or identified invalid (e.g. due to errors or timeouts) data stream associated with the computing node. Once the reset computing node re-establishes communication (e.g. through a valid serial data stream) with the failover monitors, the reset computing node can be added to the standby subset. In some implementations, a computing node can be reset based at least in part on a reset request from one or more other computing nodes. For instance, such one or more other computing nodes can provide a reset request to the failover monitors, who can grant the request if a threshold number of reset request are received.

In some implementations, the failover monitors can periodically exchange status and synchronization data, for instance, via a failover monitor bus. For example, the failover monitors can exchange data related to faults detected by built-in tests (BIT) or caused by inconsistent data. In some implementations, discrepancies in discrete data received by the failover monitors can be detected and dispositioned appropriately. As an example, a failover monitor can generate incorrect decisions because of incorrect input data. In this case the other failover monitors on the failover monitor bus can detect the erroneous inputs and log a request for a maintenance action. In cases where the failover monitor redundancy allows, the failover monitor generating incorrect decisions can be disabled as a result of the other failover monitors consensus. In implementations wherein three failover monitors are used a single failover monitor error may not cause a system error, so the disposition can be simply a caution flag and a request for maintenance at the first opportunity. In some implementations, the failover monitor bus can include isolation features across the failover monitors to ensure that power or driver failures in a first failover monitor will not propagate to the remaining failover monitors.

As indicated, providing failover control in accordance with example embodiments of the present disclosure can allow redundancy control techniques for a plurality of non-redundant computing nodes. For instance, the failover controller can be implemented with a plurality of computing nodes that are not designed for redundancy control to monitor the system functionality and to prevent malfunctioning nodes to corrupt the integrity of the system. By separating the data stream monitoring function from the computing nodes, the failover control techniques can be determined independently from the computing nodes.

With reference now to the figures, example aspects of the present disclosure will be discussed in more detail. For instance, FIG. 1 depicts an overview of an example failover control system 100 according to example embodiments of the present disclosure. Control system 100 includes computing nodes 102 and 104, failover monitors 106, 108, and 110, control request voters 112 and 114, control grant voters 116 and 118, and reset voters 120 and 122.

Control system 100 can be configured to provide failover control of a computing system, such as an avionics system associated with an aircraft. In particular, failover monitors 106-110 can monitor a data stream 124 from each computing node 102,104. Data streams 124, as depicted in FIG. 1 are single, multi-drop data stream pairs from the computing nodes to each failover monitor. However, it will be understood that various other suitable data streams can be used without deviating from the scope of the present disclosure. As indicated above, the data streams 124 can be provided to the failover monitors 106-110 subsequent to a power-on process of the computing nodes. In some implementations, the data streams 124 can be continuous, serial data streams of a predetermined sequence of data words. When failover monitors 106-110 detect or identify a sufficient number of valid data streams 124, the failover monitors 106-110 can initiate a control grant process.

In particular, failover monitors 106-110 can provide control request signals to the control request voter corresponding to the computing node(s) that provided the detected valid data streams. As indicated above, the voter circuits can be designed to fail passive/safe (e.g., tri-state) to prevent a single malfunctioning failover monitor from corrupting system 100. For instance, if computing node 102 provides the valid data stream, failover monitors 106-110 can provide the control request signals to control request voter 112. Control request voter 112 can then determine whether to activate the control request output to computing node 102 based at least in part on the number of control request signals received by voter 112. For instance, if voter 112 receives control request signals from any two failover monitors, voter 112 can activate the control request output and provide the output to computing node 102.

Upon receiving the control request signal, computing node 102 can provide a control ready signal 126 to failover monitors 106-110. For instance, the control ready signal 126 can be provided if computing node 102 is capable of receiving control authority. In some implementations, the control ready signal 126 must be provided to failover monitors 106-110 within a predetermined time period. In such implementations, if the control ready signal is not provided within the time period, the failover monitors can provide a control request signal to a different computing node (e.g. computing node 104). Upon receiving the control ready signal 126, failover monitors can be configured to provide a control grant signal to control grant voter 116. Control grant voter 116 can activate the control grant output and grant control authority to computing node 102 based at least in part on the number of control grant signals received from failover monitors 106-110. For instance, if control grant signals are received from any two failover monitors, control authority can be granted to computing node 102.

Once control authority has been granted, failover monitors 106-110 can continue to monitor data streams 124 from computing nodes 102, 104. For instance, if a valid data stream is detected from the non-controlling computing node(s) (e.g. computing node 104), the non-controlling computing node(s) can be added to a standby subset of control capable computing nodes. The standby subset can be used to select a replacement computing node to which control authority will be granted if computing node 102 loses control authority.

Computing node 102 can lose control authority by relinquishing it voluntarily, or by providing an invalid data stream 124 to failover monitors 106-110. In particular, upon detection of an invalid data stream 124 from computing node 102 (e.g. the controlling computing node), failover monitors 106-110 can initiate a reset process of computing node 102 by providing reset signals to reset voter 120. Reset voter 120 can provide a reset signal to node 102 in accordance with example embodiments of the present disclosure. In such scenario, failover monitors 106-110 can select a replacement computing node from the standby subset, and initiate the control grant process for the replacement node. Once the reset node reestablishes communication with failover monitors 106-110 by providing a valid data stream 124, the reset node can be added to the standby subset. In some implementations, if the reset node continues to provide an invalid data stream 124, the reset process can be initiated one or more additional times. If the number of reset processes reaches a threshold, the computing node can be designated as malfunctioning, and not added to the standby subset.

In some implementations, computing nodes 102,104 and/or failover monitors 106-110 can be computing devices that include one or more processors and one or more memory devices. The one or more processors can include any suitable processing device, such as a microprocessor, microcontroller, integrated circuit, logic device, or other suitable processing device. The one or more memory devices can include one or more computer-readable media, including, but not limited to, non-transitory computer-readable media, RAM, ROM, hard drives, flash drives, or other memory devices.

The one or more memory devices can store information accessible by the one or more processors, including computer-readable instructions that can be executed by the one or more processors. The instructions can be any set of instructions that when executed by the one or more processors, cause the one or more processors to perform operations. The instructions can be implemented in software written in any suitable programming language or can be implemented in hardware. In some embodiments, the instructions can be executed by the one or more processors to cause the one or more processors to perform operations, such as one or more operations corresponding to the systems and methods described herein. The memory devices can further store data that can be accessed by the processors.

The technology discussed herein is directed to computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

It will be appreciated by those skilled in the art that the example failover control system 100 depicted in FIG. 1 is for illustrative purposes only, and that various other suitable control system configurations can be used without deviating from the scope of the present disclosure. In particular, such other suitable control systems can include one or more additional computing nodes, corresponding failover monitor ports, corresponding voter circuits, etc. One or more additional failover monitors can further be included. In this manner, failover control can be provided for a control system having more than two computing nodes in accordance with example embodiments of the present disclosure.

Figure 2:
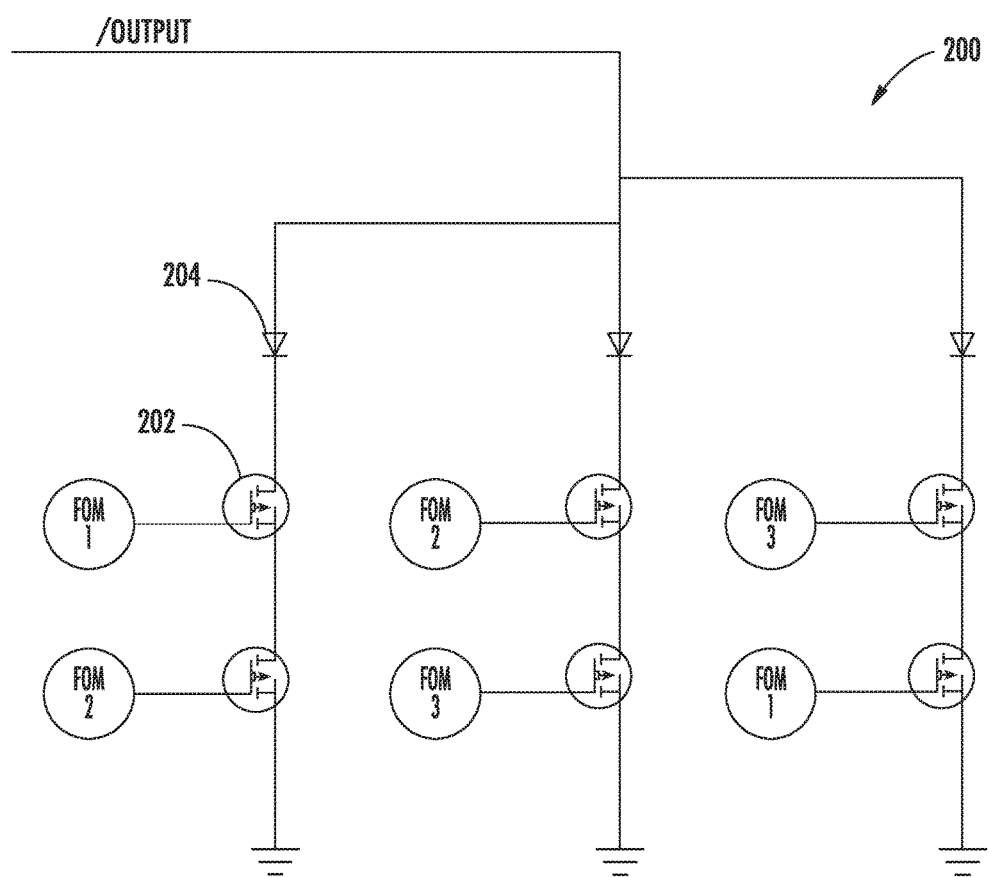
FIG. 2 depicts an example control voter circuit according to example embodiments of the present disclosure.

FIG. 2 depicts an overview of an example voter circuit 200 according to example embodiments of the present disclosure. Voter circuit 200 can correspond to one or more of voter circuits 112-122 of FIG. 1. In particular, voter circuit 200 can include a plurality of diodes 204 and switching elements 202 in an open collector and/or open drain configuration. Each switching element can receive an input gate signal from a failover monitor. As shown, voter circuit 200 can include three legs that implement the Boolean equation associated with activation of the output. For instance such open collector, three-leg structure can allow for an active output (e.g. through a low impedance path to ground) to the corresponding computing node when at least two failover monitor provide a signal with a sufficient voltage to "turn-on" the corresponding switching element. In particular, a single leg can provide a low impedance path to ground when any two failover monitors provide "turn-on" signals. All three legs can provide such a path when all three failover monitors provide "turn-on" signals. In this manner, at least two failover monitors must concur before the output is provided to the corresponding computing node.

It will be appreciated that various other suitable voter circuits can be used having various other suitable configurations or structures. For instance, one or more additional switching elements and/or one or more additional legs can be included without deviating from the scope of the present disclosure.

Figure 3:
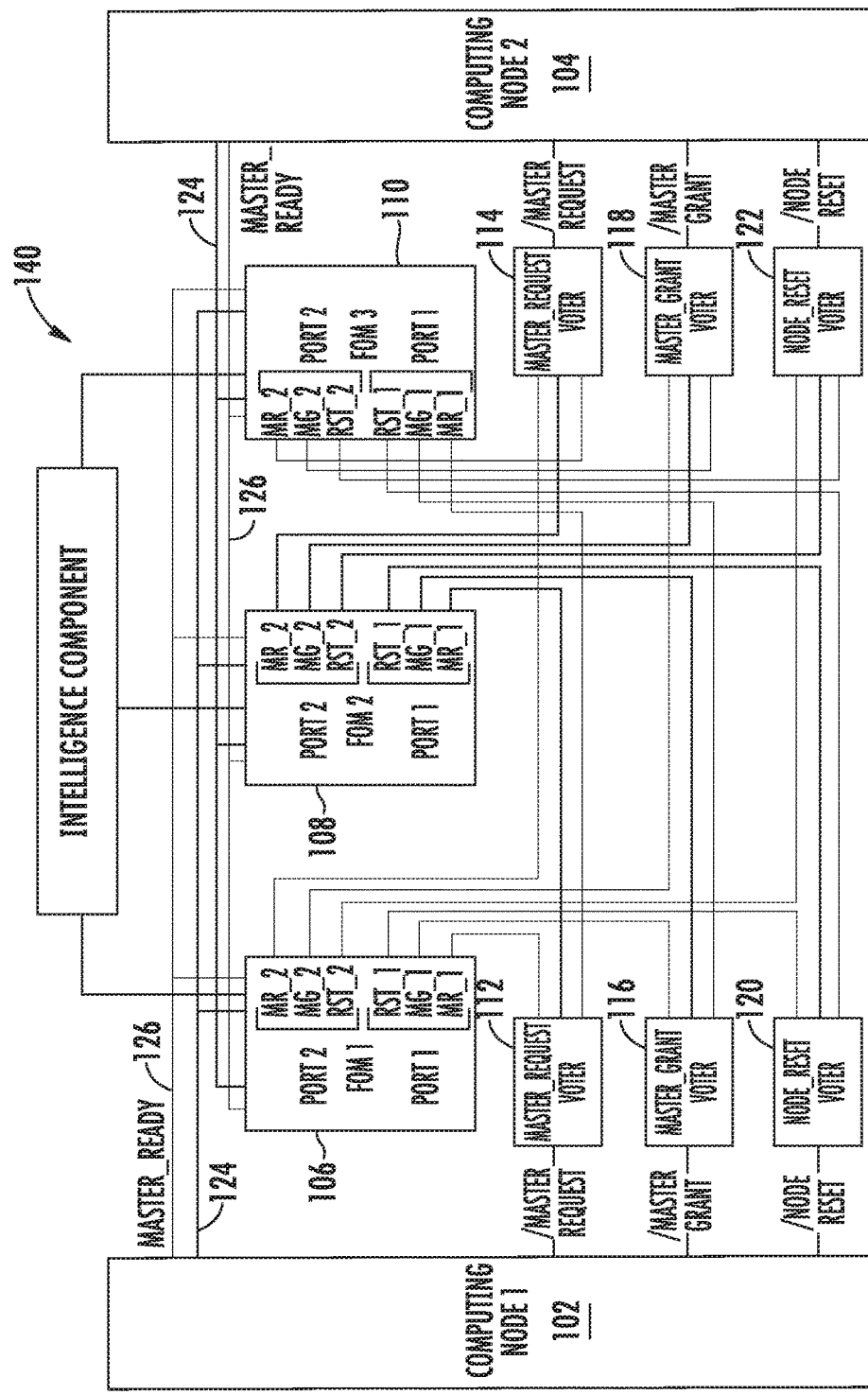
FIG. 3 depicts an example failover control circuit according to example embodiments of the present disclosure.

FIG. 3 depicts an example failover control system 140 according to example embodiments of the present disclosure. The system 140 can include an intelligence component 142 that can provide for or aid in various inferences or determinations. In particular, in accordance with or in addition to what has been described supra with respect to intelligent determination or inferences provided by various components described herein. For example, all or portions of failover control system 100, such as failover monitors 106-110, or voter circuits 112-122 (as well as other components described herein) can be operatively coupled to intelligence component 142. Additionally or alternatively, all or portions of intelligence component 142 can be included in one or more components described herein. Moreover, intelligence component 142 will typically have access to all or portions of data sets described herein.

Accordingly, in order to provide for or aid in the numerous inferences described herein, intelligence component 142 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 4:
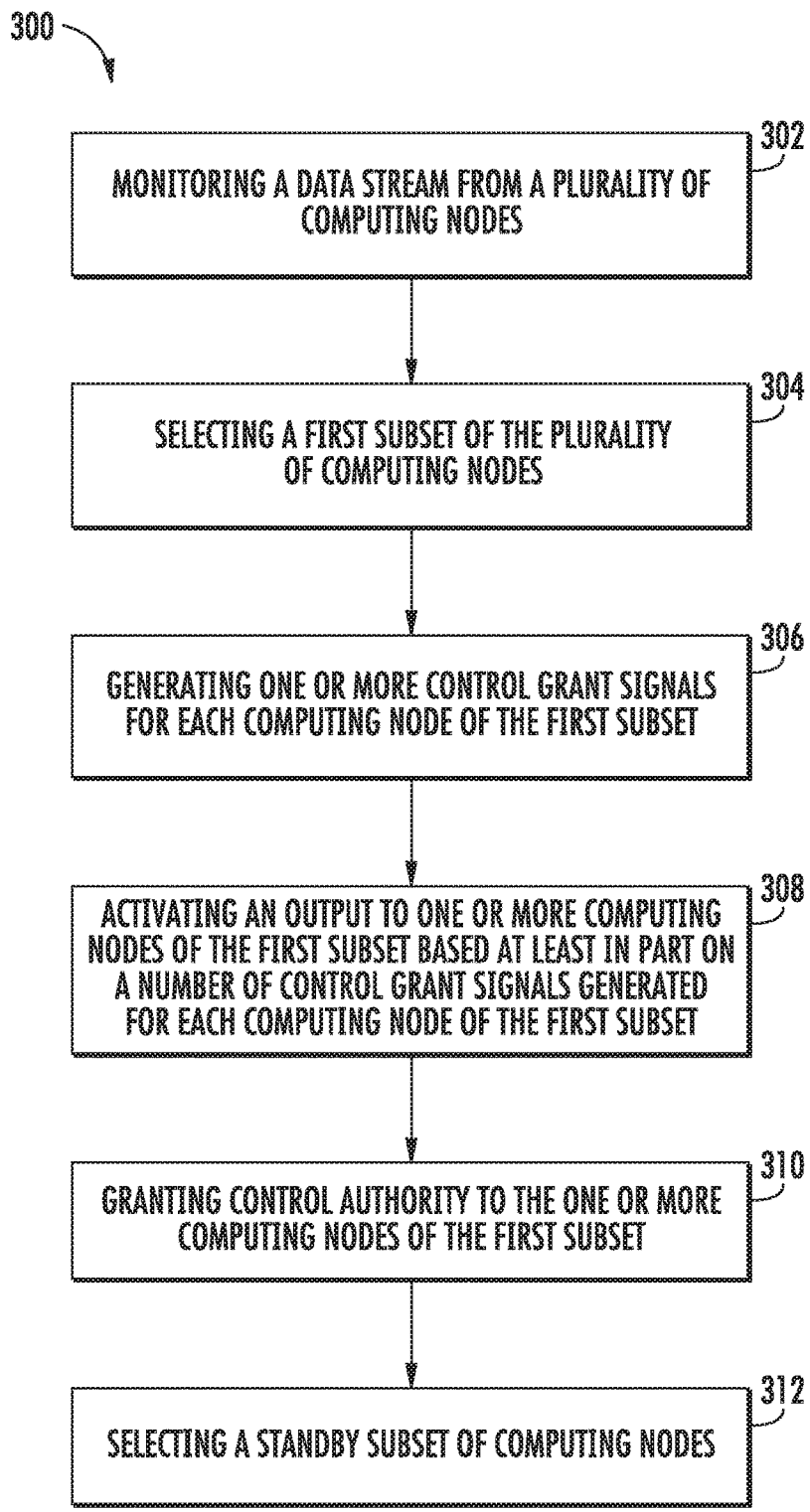
FIG. 4 depicts a flow diagram of an example method of providing failover control in a control system according to example embodiments of the present disclosure.

FIG. 4 depicts a flow diagram of an example method (300) of providing failover control authority to one or more computing nodes on a control system. Method (300) can be implemented by one or more computing devices, such as one or more of the computing devices depicted in FIG. 1. In addition, FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), method (300) includes monitoring a data stream from a plurality of computing nodes. As indicated above, the data stream can be a serial, continuous data stream including a data word sequence determined in accordance with one or more predetermined algorithms. The data streams can be indicative of a functional state of the respective computing nodes. In particular, a valid data stream can indicate a healthy, functioning computing node, while an invalid data stream can indicate a computing node that is malfunctioning in some manner. In some implementations the data streams can be monitored by a plurality of failover monitors associated with a failover controller.

At (304), method (300) can include selecting a first subset of computing nodes from the plurality of computing nodes. For instance, the first subset can correspond to one or more computing nodes to which control grant signals will be provided.

Figure 5:
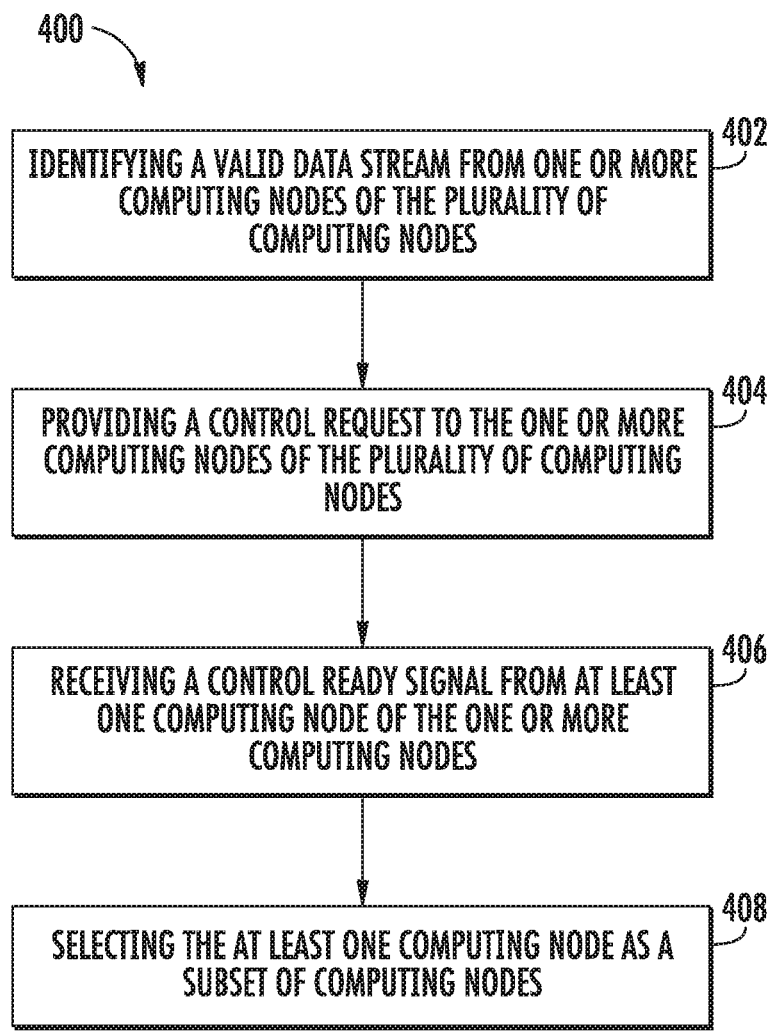
FIG. 5 depicts a flow diagram of an example method of selecting a first subset of computing nodes according to example embodiments of the present disclosure.

FIG. 5 depicts a flow diagram of an example method (400) of selecting a first subset of computing nodes. Method (400) can be implemented by one or more computing devices, such as one or more of the computing devices depicted in FIG. 1. In addition, FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (402), method (400) can include identifying a valid data stream from one or more computing nodes of the plurality of computing nodes. A valid data stream can correspond to a data stream having a correct sequence and/or timing, as determined by one or more algorithms. As indicated, in some implementations, the one or more computing nodes for which valid data streams are identified can correspond to a sufficient number of computing nodes based on the control requirements of the control system.

At (404), method (400) can include providing a control request to the one or more computing nodes of the plurality of computing nodes. The control request can be a signal provided to the one or more computing nodes requesting that the computing nodes take control authority on the control system.

At (406), method (400) can include receiving a control ready signal from at least one computing node of the one or more computing nodes. A control ready signal can indicate that the corresponding computing node is capable of receiving control authority. In this manner, the control ready signal can be provided in response to receiving the control request.

At (408), method (400) can include selecting the at least one computing node as a control subset. In this manner, the control subset can be chosen based at least in part on the data streams of the computing nodes, and the control ready signals provided by the computing nodes. It will be appreciated that the control subset can correspond to the first subset to which control grant signals will be provided and/or to the standby subset of computing nodes that are capable of receiving control authority but will not initially receive control grant signals.

Referring back to FIG. 4, at (306), method (300) can include generating one or more control grant signals for each computing node of the first subset. The control grant signals can indicate a provision of control authority to the respective computing nodes. In some implementations, the provision of control authority can be subject to a "voting" process, wherein some threshold number of control grant signals must concur.

For instance, at (308), method (300) can include activating an output to one or more computing nodes of the first subset of computing nodes based at least in part on a number of control grant signals generated for each computing node of the first subset. For instance, in implementations wherein three failover monitors are used in a failover controller (e.g. as in control system 100 of FIG. 1), control grant signals from a threshold number of failover monitors may need to be received by a corresponding voter circuit before the output to the computing node is activated. The threshold number can be selected based at least in part on the control and/or redundancy requirements of the system. In various implementations, the threshold number can be any number up to the number of failover monitors present in the system. In this manner, the corresponding voter circuits can be configured to meet this threshold requirement.

At (310), method (300) can include granting control authority to the one or more computing nodes of the first subset. For instance, control authority can be granted by providing a control grant signal to the computing node on the active output of the voter circuit. As indicated, the control grant signal can indicate to the computing node(s) that the computing nodes have control authority on the system. The control grant signal can further be used by the computing node hardware as an independent enabling signal to ensure that the correct computing nodes have control authority on a specified set of control outputs.

In some implementations, if the number of computing nodes to receive control authority on the system does not meet the redundancy requirements of the system, a control grant process, in accordance with example embodiments of the present disclosure, can be performed for one or more additional computing nodes to grant control authority to the one or more additional computing nodes. For instance, the one or more additional computing nodes can be determined to meet the redundancy control requirements of the system.

At (312), method (300) can include selecting a standby subset of computing nodes. The standby subset can be a subset of control capable computing nodes (e.g. computing nodes that are providing valid data streams). In some implementations, the standby subset can be selected using one or more of the steps performed in method (400) of FIG. 5. In particular, the standby subset can be selected based at least in part on valid data streams detected for one or more computing nodes that do not currently have control authority on the system.

As indicated, once control authority has been granted to one or more computing nodes, the data streams of the one or more computing nodes can continue to be monitored. In some implementations, control authority can be removed from a computing node based at least in part on the corresponding data stream. Control authority can further be removed from a computing node if the computing node voluntarily relinquishes or de-asserts control authority.

Figure 6:
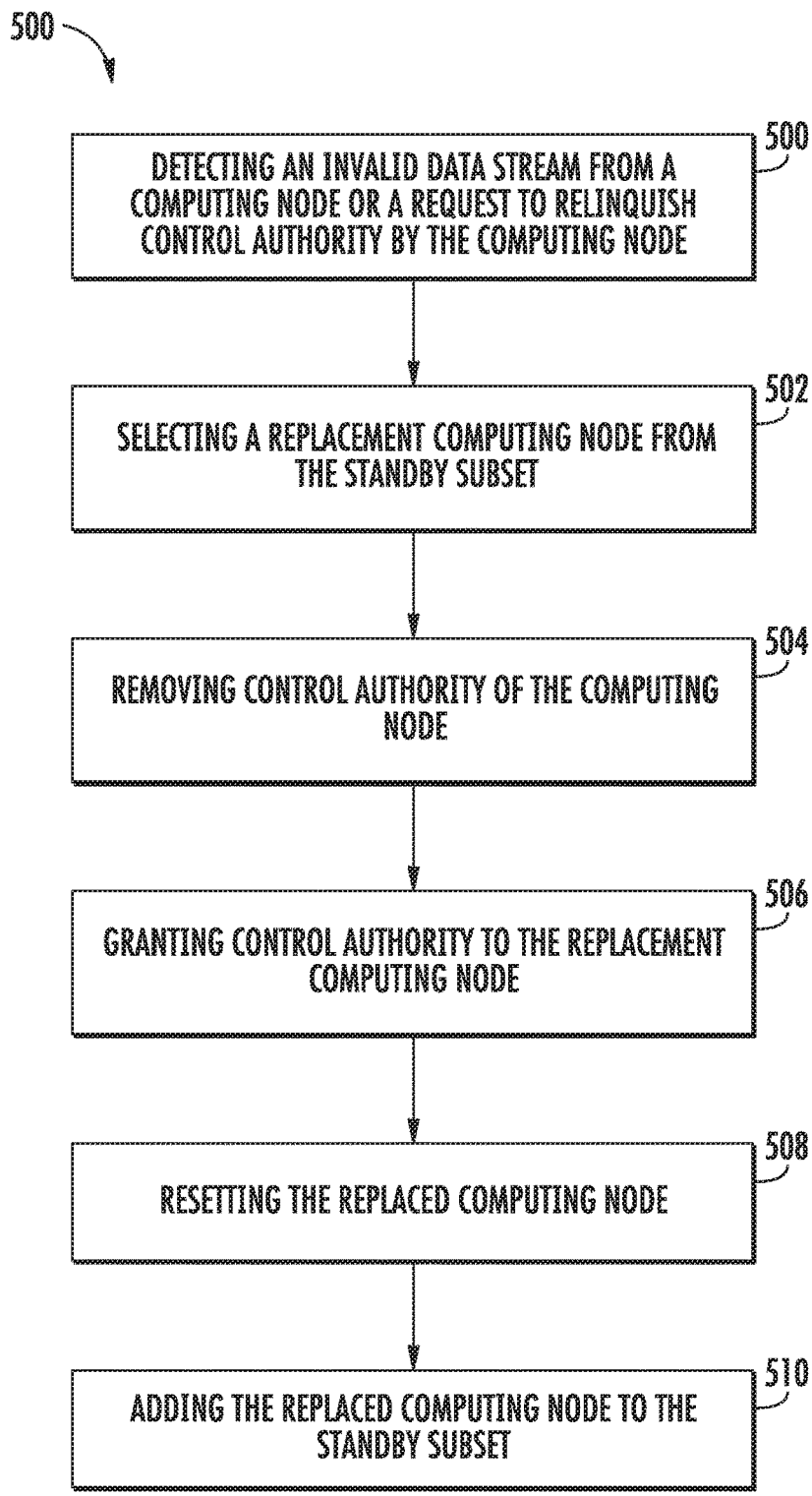
FIG. 6 depicts a flow diagram of an example method of providing a reset process of a computing node according to example embodiments of the present disclosure.

For instance, FIG. 6 depicts a flow diagram of an example method (500) of removing control authority from a computing node according to example embodiments of the present disclosure. Method (500) can be implemented by one or more computing devices, such as one or more of the computing devices depicted in FIG. 1. In addition, FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (502), method (500) can include detecting an invalid data stream (e.g. a valid stream having one or more sequence and/or timing errors) from a computing node, or a request to relinquish control authority by a computing node. In some implementations, a computing node can request to relinquish control authority if the computing node lacks the resources necessary to maintain control authority on the control system. In some implementations, a computing node can request to relinquish control authority if the computing node detects one or more errors or malfunctions within the computing node.

At (504), method (500) can include selecting a replacement computing node from the standby subset. For instance, the replacement node can be a computing node that is capable of receiving control authority on the system. In some implementations, selecting a replacement node can include initiating a control grant process for the node in accordance with example embodiments of the present disclosure. For instance, a control request signal can be provided to the node, and a control ready signal can be received from the node.

At (506), method (500) can include removing the control authority of the controlling computing node. At (508), method (500) can include granting control authority to the replacement computing node. For instance, granting control authority to the replacement node can include implementing one or more steps of method (300).

At (510), method (500) can include resetting the replaced computing node. The replaced node can be reset through a reset process implemented by the control system. For instance, the replaced node can be reset by providing a reset control signal to the computing node via a reset voter circuit. In some implementations, the node can be reset based at least in part on one or more reset requests from one or more other computing nodes.

At (512), method (500) can include adding the replaced computing node to the standby subset. In some implementations, the replaced computing node can be added to the standby subset if a valid data stream is detected for the computing node subsequent to the reset process of the computing node. In some implementations, if a valid data stream is not detected (e.g. if an invalid data stream is detected), the reset process can be repeated one or more additional times up to a threshold, or until a valid data stream is detected. If a valid data stream is detected, the computing node can then be added to the standby subset.

Figure 7:
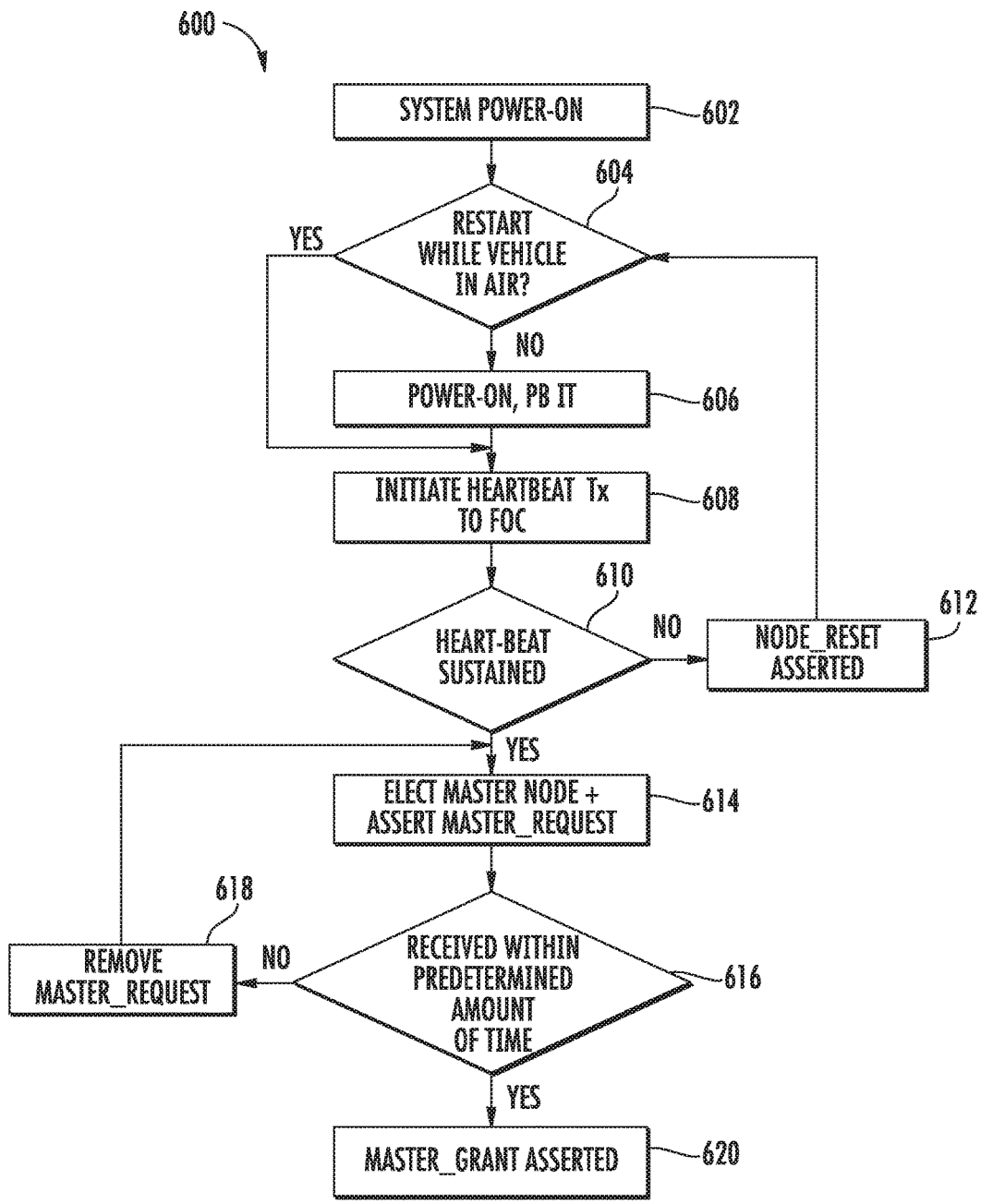
FIG. 7 depicts a flow diagram of an example method of providing failover control in a control system according to example embodiments of the present disclosure.

FIG. 7 depicts a flow diagram of an example method 600 for providing failover control for processing nodes according to example embodiments of the present disclosure. At reference numeral 602, system power-on occurs. At reference numeral 604, a determination can be made whether a re-start is occurring while a vehicle is in flight. If a re-start is not occurring while the vehicle is in flight (N at 604), then, at 606, then each computing node executes their respective Power-Up Built-In Test (PBIT).

At 608, when a computing node completes its PBIT, then the computing node initiates a Heart Beat data stream (Heart Beat) to the fail-over controller (FOC). For example, the Heart Beat can include sending a stream of data words computed according to a pre-determined algorithm. Additionally, completion of the PBIT can include satisfaction of a set of predetermined or user-set PBIT criteria. For instance, the set of PBIT criteria can include a time threshold, a health threshold, etc. Returning to reference numeral 604, if re-start is occurring while the vehicle is in flight (Y at 604), then the methodology advances to reference numeral 608.

At reference numeral 610, a determination is made whether the Heart Beat for each node is sustained. If the Heart Beat is not sustained by a computing node (N at 610), then, at 612, the computing node is reset, and the methodology returns to reference numeral 604 for the computing node. Returning to reference numeral 610, if the Heart Beat is sustained by a quantity of computing nodes 106 satisfying a predetermined threshold (Y at 610), then, at 614, each fail-over monitor (FOM) selects, chooses, or otherwise determines one computing node. If a majority of the FOMs achieve the same decision, then the selected computing node 106 is requested to be the master node. For example, the FOC can assert Master_Request for the selected computing node. Additionally or alternatively, each fail-over monitor (FOM) can select a set of the computing nodes, and a subset of computing nodes can be requested to be master nodes.

At reference numeral 616, a determination is made whether a master ready indication is received from the selected node within a predetermined period of time. For example, the selected node can assert Master_Ready. If the master ready indication is not received with the predetermined period of time (N at 616), then, at 618, the request for the node to be the master is removed, and the methodology returns to 614 to select another master node. For example, the Master_Request for the selected computing node can be removed by the FOC. Returning to reference numeral 616, if the master ready indication is received within the predetermined period of time, then the selected computing node is designated as the master node and given control authority. For example, Master_Grant can be asserted for the selected computing node 106

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of providing failover control in a computing system, the method comprising:
    monitoring a data stream generated by a plurality of computing nodes in a computing system; and
    selecting a first subset of the plurality of computing nodes based at least in part on the monitored data stream;
    generating one or more control grant signals for each computing node of the first subset;
    determining that the one or more control grant signals for one or more of the computing nodes in the first subset satisfies a predetermined threshold;
    in response to determining the one or more control grant signals for one or more of the computing nodes in the first subset satisfies the predetermined threshold, granting control authority of the computing system to the one or more computing nodes of the first subset;
    subsequent to granting control authority of the computing system to the one or more computing nodes of the first subset, identifying at least one control capable computing node that has not been granted control authority of the computing system; and
    selecting the at least one control capable computing node as a second subset of the plurality of computing nodes.

2. The method of claim 1, wherein selecting a first subset of the plurality of computing nodes comprises:
    identifying a valid data stream from one or more computing nodes of the plurality of computing nodes;
    providing a control request signal to the one or more computing nodes of the plurality of computing nodes;
    receiving a control ready signal from at least one computing node of the one or more computing nodes of the plurality of computing nodes; and
    selecting the at least one computing node as the first subset of computing nodes.

3. A method of providing failover control in a computing system, the method comprising:
    monitoring a data stream generated by a plurality of computing nodes in a computing system; and
    selecting a first subset of the plurality of computing nodes based at least in part on the monitored data stream;
    generating one or more control grant signals for each computing node of the first subset;
    determining that the one or more control grant signals for one or more of the computing nodes in the first subset satisfies a predetermined threshold; and
    in response to determining the one or more control grant signals for one or more of the computing nodes in the first subset satisfies the predetermined threshold, granting control authority of the computing system to the one or more computing nodes of the first subset,
    wherein selecting a first subset of the plurality of computing nodes comprises:
    identifying a valid data stream from one or more computing nodes of the plurality of computing nodes, wherein identifying a valid data stream comprises comparing a sequence of data words in the data stream to a predetermined sequence of data words;
    providing a control request signal to the one or more computing nodes of the plurality of computing nodes;
    receiving a control ready signal from at least one computing node of the one or more computing nodes of the plurality of computing nodes; and
    selecting the at least one computing node as the first subset of computing nodes.

4. The method of claim 1, wherein identifying at least one control capable computing node comprises identifying a valid data stream from at least one computing node that has not been granted control authority of the computing system.

5. The method of claim 1, further comprising:
    detecting an invalid data stream from a computing node that has been granted control authority of the computing system;
    removing the control authority of the computing system from the computing node corresponding to the invalid data stream; and
    granting control authority of the computing system to a computing node from the second subset.

6. The method of claim 1, further comprising:
    receiving a signal from a computing node that has been granted control authority of the computing system indicative of a request to relinquish control authority;
    removing the control authority of the computing system from the computing node;
    granting control authority of the computing system to a computing node from the second subset.

7. The method of claim 5, further comprising resetting the computing node corresponding to the invalid data stream.

8. The method of claim 7, further comprising:
    subsequent to resetting the computing node, identifying a valid data stream from the reset computing node; and
    adding the computing node to the second subset.

9. The method of claim 7, further comprising receiving a request from at least one additional computing node to reset the computing node corresponding to the invalid data stream; and
    wherein resetting the computing node comprises resetting the computing node based at least in part on the request from the at least one additional computing node.

10. The method of claim 1, wherein each monitored data stream comprise a continuous, serial data stream determined in accordance with one or more predetermined algorithms.

11. The method of claim 1, wherein the computing system comprises an avionics computing system associated with an aircraft.

12. A failover control system for granting computing nodes control authority of a computing system, the system comprising:
- a plurality of computing nodes;
- a failover controller configured to grant control authority to at least one computing node, the failover controller comprising:
  - a plurality of failover monitors configured to monitor a data stream from each computing node, select a first subset of the plurality of computing nodes based at least in part on the monitored data stream, and generate one or more control grant signals for at least one computing node of the first subset; and
  - a plurality of control vote circuits, each control vote circuit coupled between the plurality of failover monitors and a computing node, each control vote circuit configured to grant control authority to the corresponding computing node when the control vote circuit receives at least two control grant signals from the plurality of failover monitors.

13. The failover control system of claim 12, wherein the plurality of failover monitors are configured to select a first subset of the plurality of computing nodes by:
- identifying a valid data stream from one or more computing nodes of the plurality of computing nodes;
- providing a control request signal to the one or more computing nodes of the plurality of computing nodes;
- receiving a control ready signal from at least one computing node of the one or more computing nodes of the plurality of computing nodes; and
- selecting the at least one computing node as the first subset of computing nodes.

14. The failover control system of claim 13, wherein identifying a valid data stream comprises comparing a sequence of data words in the data stream to a predetermined sequence of data words.

15. The failover control system of claim 12, wherein the plurality of failover monitors is further configured to:
- subsequent to granting control authority of the computing system to the one or more computing nodes of the first subset, identify at least one control capable computing node that has not been granted control authority of the computing system; and
- select the at least one control capable computing node as a second subset of the plurality of computing nodes.

16. The failover control system of claim 12, wherein each control vote circuit is configured to grant control authority to the corresponding computing node when the control vote circuit receives control grant signals from at least a majority of the plurality of failover monitors.

17. A control system for an aircraft, the control system comprising:
- a plurality of computing nodes;
- a failover controller configured to grant control authority to at least one computing node, the failover controller comprising:
  - a plurality of failover monitors configured to monitor a data stream from each computing node, select a first subset of the plurality of computing nodes based at least in part on the monitored data stream, and generate one or more control grant signals for at least one computing node of the first subset; and
  - a plurality of control vote circuits, each control vote circuit coupled between the plurality of failover monitors and a computing node, each control vote circuit configured to grant control authority to the corresponding computing node when the control vote circuit receives control grant signals from at least a majority of the plurality of failover monitors.

18. The control system of claim 17, wherein the plurality of failover monitors are configured to select a first subset of the plurality of computing nodes by:
- identifying a valid data stream from one or more computing nodes of the plurality of computing nodes;
- providing a control request signal to the one or more computing nodes of the plurality of computing nodes;
- receiving a control ready signal from at least one computing node of the one or more computing nodes of the plurality of computing nodes; and
- selecting the at least one computing node as the first subset of computing nodes.

19. The control system of claim 18, wherein identifying a valid data stream comprises comparing a sequence of data words in the data stream to a predetermined sequence of data words.

* * * * *